United States Patent
Dauber et al.

(10) Patent No.: US 6,799,811 B1
(45) Date of Patent: Oct. 5, 2004

(54) STEER AXLE WITH KINGPIN BOSS

(75) Inventors: Dennis Dauber, Jenison, MI (US);
David G. Moses, Decatur, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/136,597

(22) Filed: May 1, 2002

(51) Int. Cl.[7] .......................... B60B 35/00; B60B 37/00; B62D 7/18
(52) U.S. Cl. ............... 301/124.1; 301/127; 280/93.512; 180/905
(58) Field of Search .............................. 301/124.1, 125, 301/127, 129; 180/408, 409, 414, 416, 436, 437, 905; 280/781, 786, 787, 788, 93.502, 93.51, 93.511, 93.512

(56) References Cited

U.S. PATENT DOCUMENTS

| | | | |
|---|---|---|---|
| 1,841,735 A | * | 1/1932 | Hufferd et al. .......... 301/124.1 |
| 3,804,467 A | * | 4/1974 | Austermann ................ 301/127 |
| 5,350,183 A | | 9/1994 | Shealy |
| 5,429,423 A | | 7/1995 | Pollock et al. |
| 5,588,660 A | | 12/1996 | Paddison |
| 5,741,027 A | | 4/1998 | Stroh et al. |
| 6,196,563 B1 | * | 3/2001 | Haycraft ................ 280/93.512 |
| 6,416,136 B1 | * | 7/2002 | Smith ......................... 301/128 |
| 6,579,026 B2 | * | 6/2003 | Moses et al. .......... 280/93.512 |

* cited by examiner

*Primary Examiner*—S. Joseph Morano
*Assistant Examiner*—Jason R. Bellinger
(74) *Attorney, Agent, or Firm*—Dykema Gossett PLLC

(57) ABSTRACT

An improved steering axle provides an improved interface between the steering knuckle kingpin and the axle. The axle includes distal ends, each formed into a boss with a central bore configured to receive the kingpin of a knuckle assembly. The boss has an improved structure that includes first and second axially extending and angularly spaced ribs each defining an axial portion having increased thickness. Each rib extends angularly from a location longitudinally outboard of the bore axis to a location longitudinally inboard of the bore axis. The boss provides increased rigidity in the area surrounding the kingpin, thereby improving retention of the kingpin and preventing motion between the kingpin and the boss.

14 Claims, 6 Drawing Sheets

STEER AXLE WITH KINGPIN BOSS

FIELD OF INVENTION

The present invention relates to an improved steering axle, and specifically to a steering axle having improved structure for a boss to retain a steering knuckle kingpin.

BACKGROUND

Forged beam axles are used on a variety of vehicles, including large vehicles such as light trucks and commercial trucks. These axles endure high loads which are transmitted to the axle through the wheel. On a steering axle, a steering knuckle supports the wheel and connects the wheel to the axle. The steering knuckle is attached to the axle with a kingpin. The kingpin is received in a boss on the end of the axle and is kept stationary relative to the axle while the steering knuckle rotates about the kingpin in response to action of the steering linkage. To reduce the likelihood that the kingpin will move relative to the axle, a draw-key is inserted into the assembly. The draw key is inserted through an aperture in the axle boss. The aperture intersects the bore, and the draw key is inserted through the aperture and is positioned between a recess in the kingpin and the boss, thereby preventing movement between the kingpin and the axle. Typically a draw key will have a hex head and a cylindrical shaft with a threaded end. A nut is torqued on the threaded end to secure the draw-key in place.

Loads applied during driving cause some bending action in the axle in the horizontal plane, and at times greater bending forces in the vertical plane. When loads are applied during braking, bending forces in the horizontal plane increase. Depending on the configuration of the axle, the forces on the axle may act as torsional forces causing some twisting action in the axle. On a steering axle, these forces are transmitted to the axle through the kingpin interface with the axle boss, and can adversely affect wear between the kingpin and the axle boss. These forces can also adversely affect the wear of the draw-key and its effectiveness in preventing relative movement between the kingpin and boss. Hence there exists a need for an improved interface between a steering knuckle kingpin and axle.

SUMMARY OF INVENTION

The present invention provides an improved steering axle providing an improved interface between the steering knuckle kingpin and the axle. The result is an axle better suited to handle the loads applied to the axle through the steering knuckle kingpin and a steering axle boss. The axle includes distal ends, each formed into a boss with a central bore configured to receive the kingpin of a knuckle assembly. The boss additionally includes first and second axially extending and angularly spaced ribs each defining an axial portion having increased thickness. Each rib extends angularly from a location outboard of the bore axis to a location inboard of the bore axis. The boss provides increased rigidity in the area surrounding the kingpin, thereby improving retention of the kingpin and preventing motion between the kingpin and the boss. The boss also improves the fatigue life of the distal end of the axle. The improved steering axle provided herein, provides improved performance without significant increase in weight or cost.

Other aspects of the present invention are provided with reference to the figures and detailed description of embodiments provided herein.

DETAILED DESCRIPTION

Figure 1:
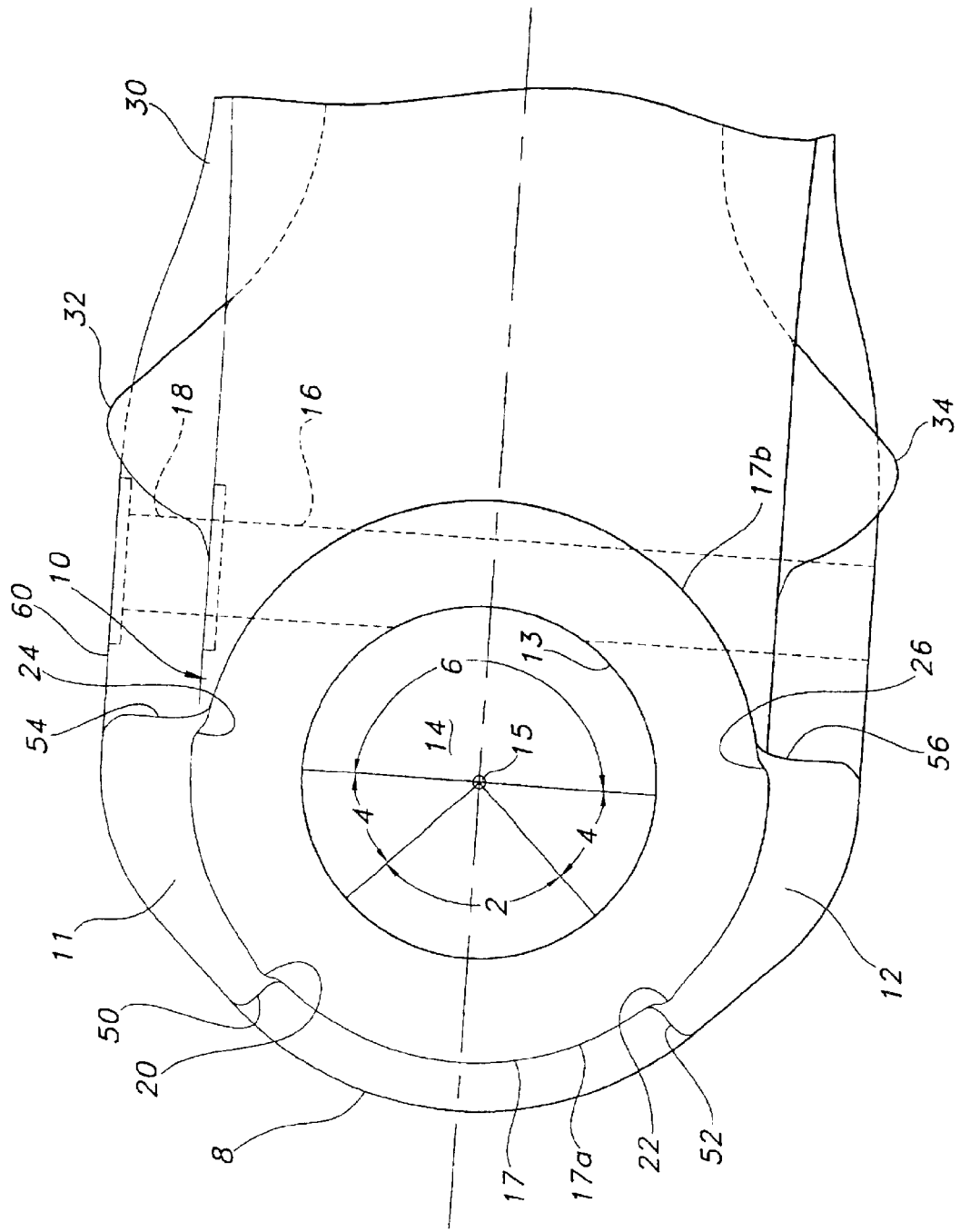
FIG. 1 illustrates a plan view of an embodiment of a steering axle boss.

According to the present invention, the distal end of an improved steering axle forms a boss having first and second axially extending and angularly spaced reinforcing ribs. As shown in the plan view of FIG. 1 the boss 10 has an outer surface 17 and an inner surface 13 that forms a bore 14 configured to receive a kingpin of a knuckle assembly. The bore 14 is defined, in part, by a central bore axis 15 running through the length of the bore 14. The boss 10 further includes first and second axially extending and angularly spaced ribs 11, 12. The first 11 and second 12 ribs are angularly spaced apart from one another to form separate ribs 11, 12. Each rib 11, 12 defines an axial length of the boss 10 having an increased thickness. Each rib 11, 12 extends in the axial direction, and in the angular direction. In the angular direction, each rib extends around the boss 10 from a location outboard 20, 22 of the bore axis 15 to a location inboard 24, 26 of the bore axis 15. Each rib 11, 12 is subtended by a rib angle 4. Each rib 11, 12 is separated from the other rib 12, 11 both outboard of the central bore axis 15 and inboard of the central bore axis 15. More specifically, an outboard distance subtended by an outboard angle 2 separates each rib 1, 12 outboard of the bore axis 15, and an inboard distance subtended by an inboard angle 6 separates each rib 11, 12 inboard of the bore axis 15. The boss 10 is configured to receive a kingpin of a knuckle assembly in the bore 14. The boss 10 of this embodiment provides increased rigidity in the area surrounding the kingpin, thereby improving retention of the kingpin and preventing motion between the kingpin and the boss 10. The boss 10 of this embodiment also improves the fatigue life of the boss 10 portion of the axle 50. Steering stops 32, 34 are provided in the transition region 30 where the axle 50 transitions from a beam 36 to form the boss 10 at the distal end 60. The steering stops 32, 34 are configured to limit the rotation of the steering knuckle about the kingpin, thereby maintaining wheel direction within the desired range.

In FIG. 1, the boss 10 incorporates first and second axially extending and angularly spaced ribs 11, 12 that are angularly defined about the bore axis 15 by a rib angle 4 of about 45 degrees and are separated outboard of the bore axis 15 by a distance subtended by an outboard angle 2 of about 90 degrees. The axially extending and angularly spaced ribs 11, 12 are further characterized in that they are separated inboard of the bore axis 15 by a distance subtended by an inboard angle 6 of about 180 degrees. In an alternative embodiment, the boss 10 may incorporate first and second axially extending and angularly spaced ribs 11, 12 that are defined about the bore axis 15 by a rib angle 4 of about 45 degrees or more and are separated outboard of the bore axis 15 by a distance subtended by an outboard angle 2 of about 90 degrees. The axially extending and angularly spaced ribs 11, 12 are further characterized in that they are separated inboard of the bore axis 15 by a distance subtended by an inboard angle δ of about 180 degrees or less. Each outboard side 50, 52 of each rib 11, 12 gradually blends toward the adjacent outer surface 17a of the boss 10 outboard of the central bore axis 15. And each inboard side 54, 56 of each rib 11, 12 gradually blends toward the adjacent outer surface 17b of the boss 10 inboard of the central bore axis 15. Although specific configurations for the first and second ribs 11, 12 are discussed, other embodiments may incorporate a first and second rib having a width defined by a rib angle 4 other than about 45 degrees, and the ribs 11, 12 may be separated outboard of the bore axis 15 by an outboard angle 2 other than about 90 degrees, the first and second rib may be separated inboard of the bore axis 15 by an inboard angle 6 other than 180 degrees. A boss 10 is incorporated into each distal end 60 of a steering axle beam 36. An exemplary steering axle beam 36 is described herein with reference to FIG. 2 and FIG. 3. While a specific steering axle beam 36 is described, the boss 10 may be used with other steering axle beams as well.

Figure 2:
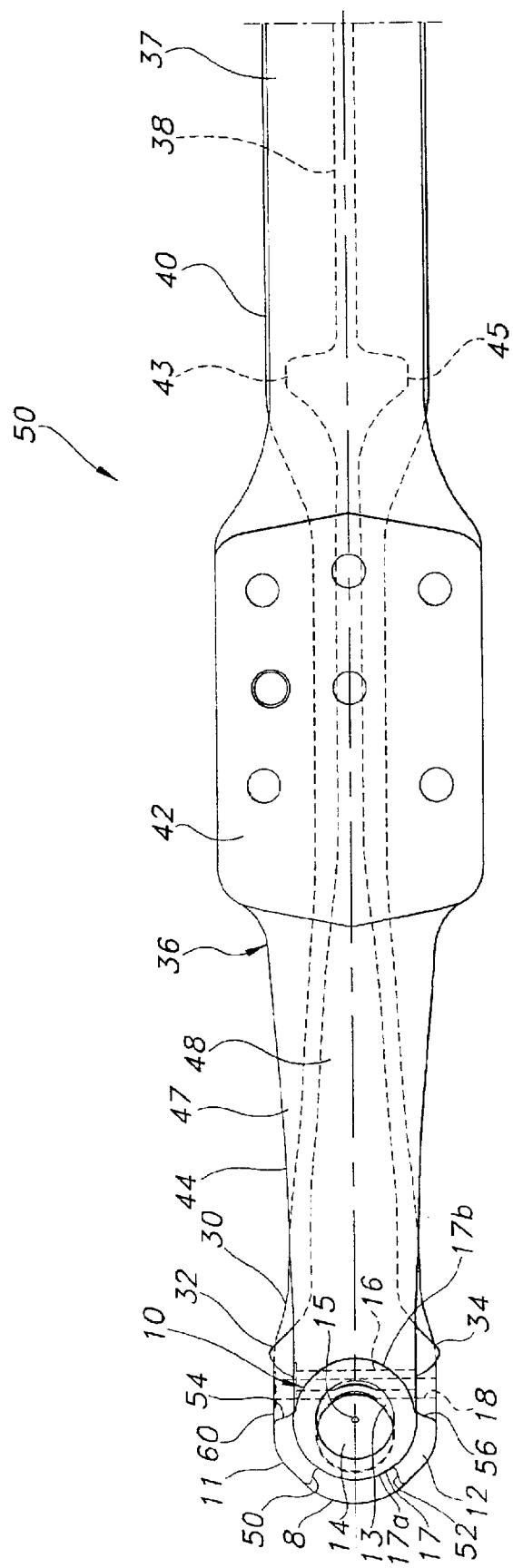
FIG. 2 illustrates a plan view of an embodiment of a steering axle.

FIG. 2 is plan view of an embodiment of an improved steering axle 50 of the present invention. As indicated by the vertical centerline one half of the steering axle 50 is shown for clarity, the other half being a mirror image of the half shown. In this embodiment, the improved axle 50 incorporates the boss 10 having axially extending and angularly spaced ribs 11, 12, and also an integrally forged spring mounting pad 42.

Figure 3:
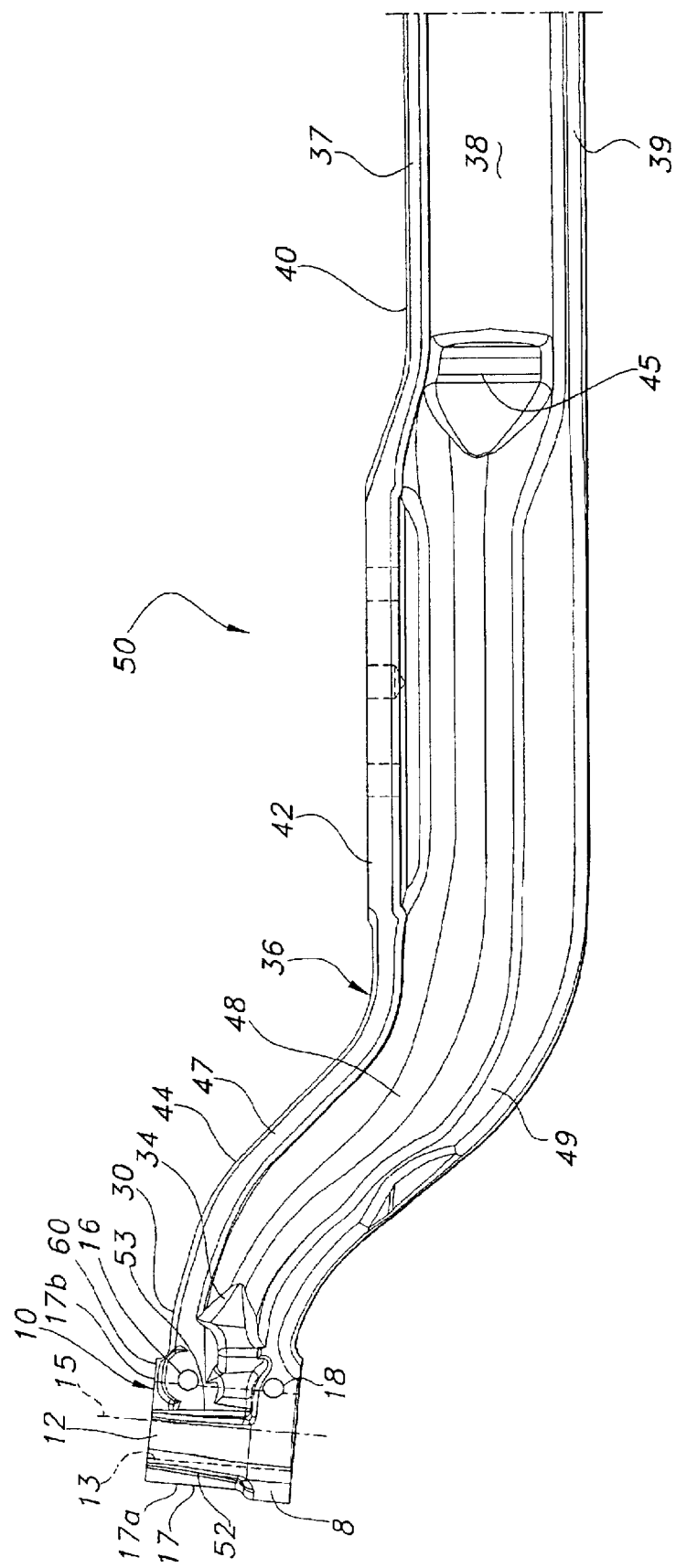
FIG. 3 illustrates a side view of an embodiment of a steering axle.

FIG. 3 is a side view of an embodiment of an improved steering axle 50 of the present invention. As indicated by the vertical centerline one half of the steering axle 50 is shown for clarity, the other half being a mirror image of the half shown. The boss 10 further includes a circumferential reinforcement 8 that extends uniformly around the boss 10 and defines a circumferential portion having an increased thickness. In this embodiment, the first and second axially extending and angularly spaced ribs 11, 12 extend from the circumferential reinforcement 8 and have a nonuniform rib thickness that gradually decreases as each rib extends farther from the circumferential reinforcement 8. In this embodiment, the circumferential reinforcement 8 is positioned about a lower end of the bore axis 15. Each outboard side 50, 52 gradually blends with the circumferential reinforcement 8 outboard of the central bore axis 15. And each inboard side 54, 56 gradually blends with the circumferential reinforcement 8 inboard of the central bore axis 15.

The boss 10 further includes at least one draw-key aperture that intersects the inner surface 13 of the boss 10 and is located inboard of the first and second axially extending and angularly spaced ribs 11, 12. In this embodiment, the boss 10 incorporates two draw key apertures 16, 18. The boss 10 of this embodiment is configured for use with a kingpin having a recess corresponding to each draw key aperture 16, 18. Together each draw key aperture 16, 18 and corresponding kingpin recess form a passage for receiving the draw-key. In this embodiment, the draw-key apertures 16, 18 are located between the first and second axially extending and angularly spaced ribs 11, 12 and the pair of steering stops 32, 34. The lower draw key aperture 18 is located in the area of the boss having the circumferential reinforcement 8. This provides extra rigidity in the interface between the kingpin and the boss 10 additionally improving retention of the kingpin and preventing motion between the kingpin and the boss 10. The boss 10 of this embodiment also improves the fatigue life of the boss 10 portion of the axle 50.

The improved steering axle 50 of FIG. 3 further includes a beam 36 having a central transverse beam section 40, an outer S-shaped beam section 44 extending upward on each side of the transverse beam section 40 between the transverse beam section 40 and each boss 10. The improved axle 50 also includes a pair of spaced apart spring mounting pads 42 on each end of the transverse beam section 40 inboard of each S-shaped beam section 44. One side of the steering axle 50 is shown, the other side being a mirror image of the side shown.

The S-shaped beam section 44 of the steering axle 50 includes an I-shaped cross section defined by a single pair of vertically spaced apart flanges 47, 49 and an interconnecting web 48. The I-shaped cross section helps to reduce weight of the S-shaped beam section 44 of the beam 36 while providing sufficient load carrying capability to withstand heavy loads. As best shown in FIG. 2, the interconnecting web 48 of the S-shaped beam section 44 has a non-uniform web width that gradually increases along the length of the S-shaped beam section 44 so that the web 48 is thicker at the outboard end than at the inboard end of the S-shaped beam section 44. The axle 50 then forms a transition region 30 where the beam 36 transitions to form the boss 10. The increased width of the interconnecting web 48 and the gradual transition from the beam section 44 to the boss 10 as shown in the transition region 30, increase the strength and stiffness of the beam 36 in the portion proximate the boss 10. This helps to reduce the likelihood that the distal portion of the beam 36 will bend or twist in response to road loads transmitted through the kingpin and boss 10 interface.

According to this embodiment, the transverse beam section 40 also has an I-shaped cross-section defined by a pair of vertically spaced apart flanges 37, 39 and an interconnecting web 38. The I-shaped cross section helps to reduce weight of the transverse beam section 40 of the beam 36 while providing sufficient load carrying capability to withstand heavy loads. In addition, the transverse beam section 40 includes at least one reinforcing rib extending between the spaced apart flanges 37, 39. As best shown in FIG. 3, a pair of reinforcing ribs 43, 45 are positioned inboard of each spring mounting pad 42 on opposing sides of the web 38.

Figure 4:
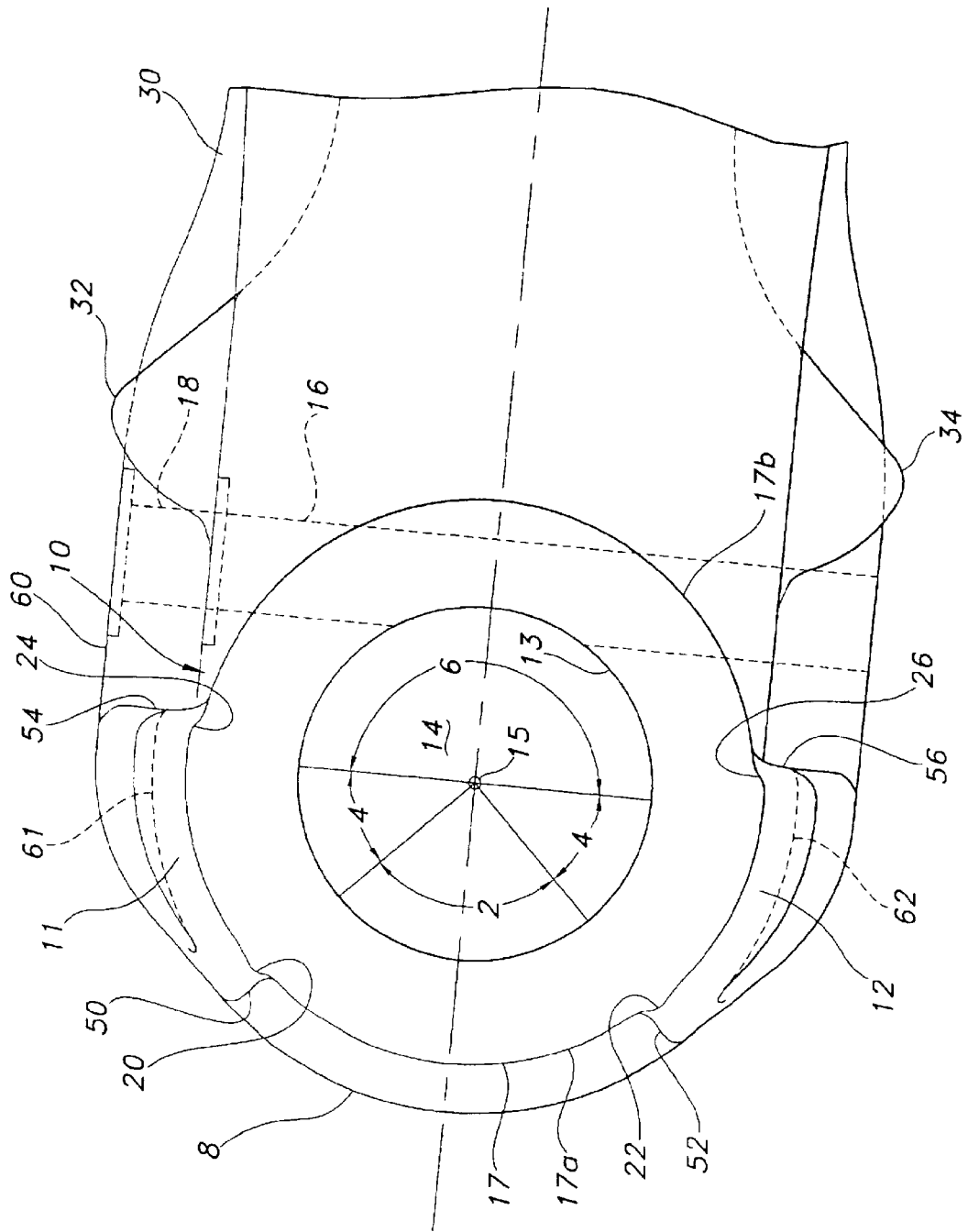
FIG. 4 illustrates a plan view of an embodiment of a steering axle boss.

FIG. 4 illustrates a plan view of an embodiment of a steering axle boss 10 in which first and second 11, 12 ribs further include recessed portions 61, 62. The recess portions 61, 62 blend gradually with the ribs 11, 12 and each have an inner depth suitable for providing clearance to a portion of the steering knuckle. Steering stops 32, 34 are configured to limit the rotation of the steering knuckle about the kingpin, thereby maintaining wheel direction within the desired range. When the steering knuckle reaches its maximum turn angles, the recess portions 61, 62 provide clearance to prevent interference between a portion of the steering knuckle and the first and second ribs 11, 12. Each recessed portion 61, 62 defines an area of the rib having decreased thickness from surrounding portions of the rib 11, 12. While each recessed portion 61, 62 partially reduces the thickness of each rib 11, 12 in a localized area, the recessed portions 61, 62 extend from the boss 10 in the axial direction and the radial direction to define an axial length of the boss 10 having an increased thickness.

Figure 5:
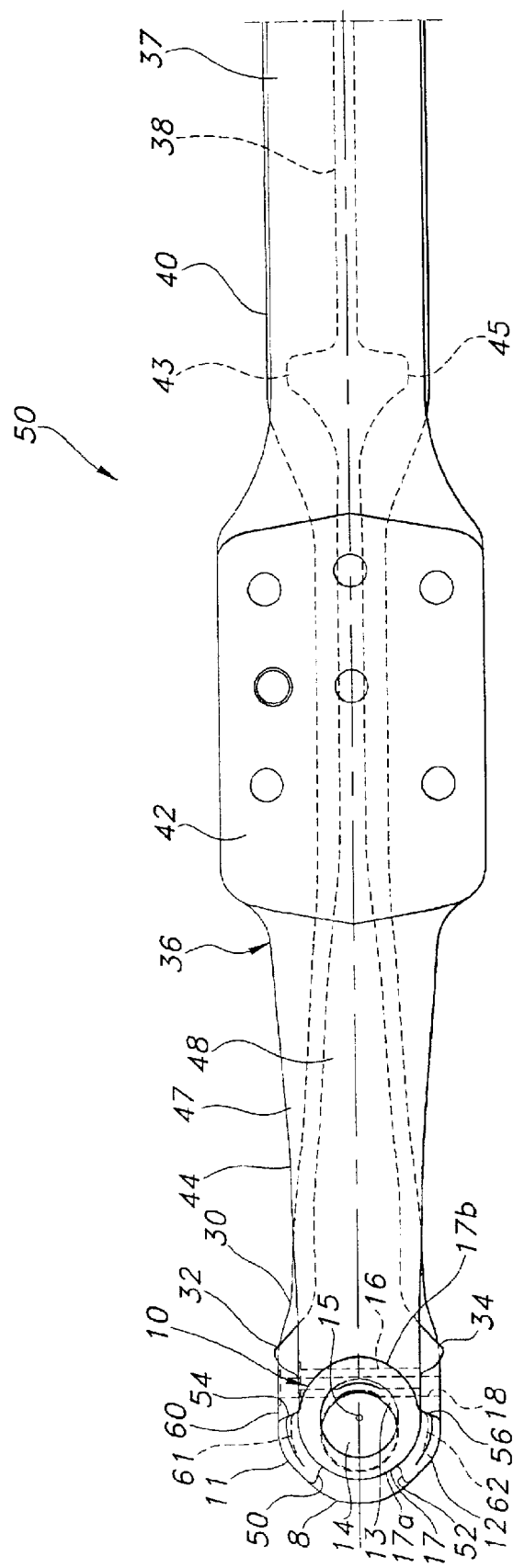
FIG. 5 illustrates a plan view of an embodiment of a steering axle.

FIG. 5 illustrates a plan view of a steering axle having a boss 10 in which first and second 11, 12 ribs further include recessed portions 61, 62. As indicated by the vertical centerline one half of the steering axle 50 is shown for clarity, the other half being a mirror image of the half shown.

Figure 6:
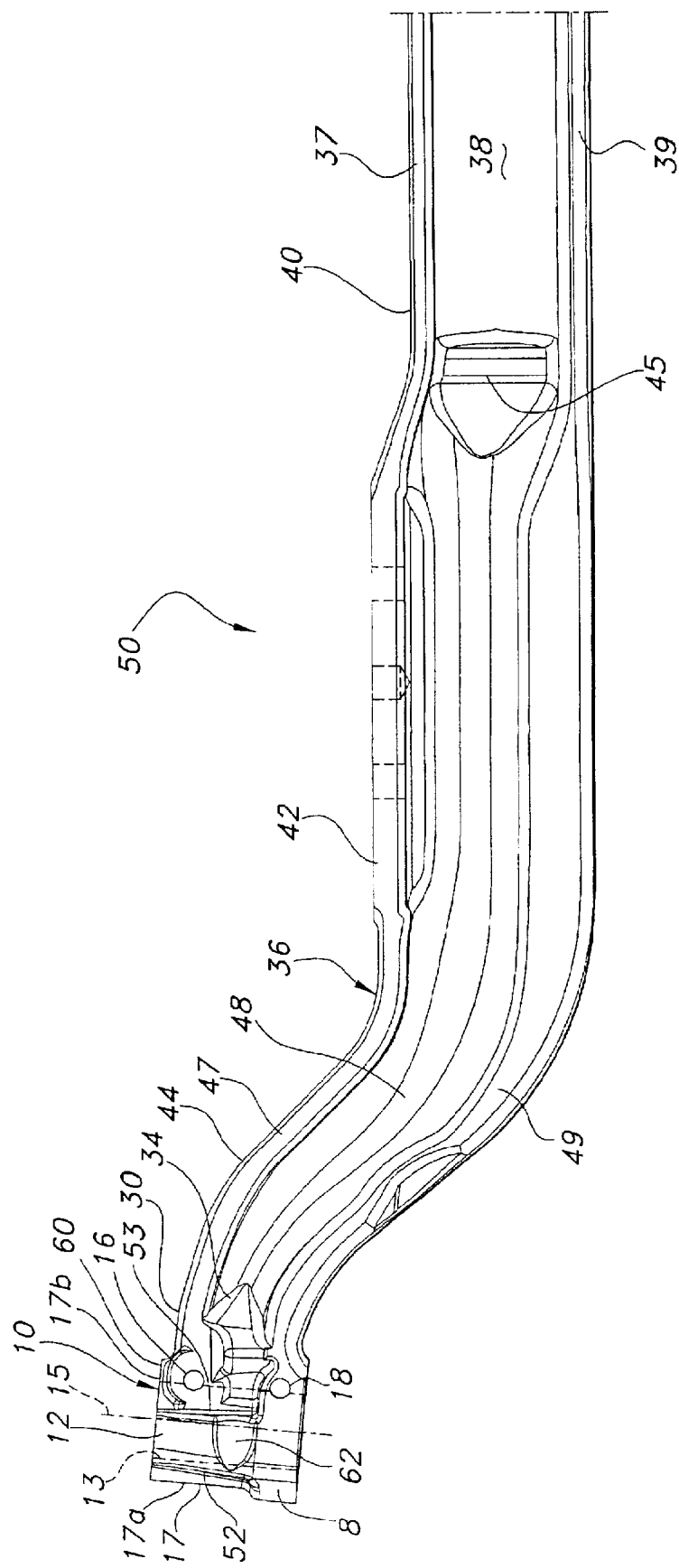
FIG. 6 illustrates a side view of an embodiment of a steering axle.

FIG. 6 illustrates a side view of a steering axle 50 having a boss 10 in which first and second ribs 11, 12 further include recess portions 61, 62. As indicated by the vertical centerline one half of the steering axle 50 is shown for clarity, the other half being a mirror image of the half shown. As shown in this view, the recessed portions 61, 62 are located in a portion of each rib 11, 12 and are suitable for providing clearance to a portion of the kingpin assembly connected to the boss 10 when the steering knuckle assembly reaches its maximum turn angles. Each recessed portion 61, 62 defines an area of the rib having decreased thickness from surrounding portions of the rib 11, 12. According to one embodiment, each recessed portion 61, 62 is located proximal to the circumferential reinforcement 8. The recess portion 61, 62 gradually extends out from the middle of the recessed portion 61, 62 where the recess has greatest depth to the portion of the rib 11, 12 above and below the recess 61, 62. In addition, the recess portion 61, 62 gradually extends out from the middle of the recess to a portion of the rib 11, 12 outboard of the central bore axis 15. The recessed portion 61, 62 intersects with the portion of rib 11, 12 inboard of the central bore axis to provide clearance. While each recessed portion 61, 62 partially reduces the thickness of each rib 11, 12 in a localized area, the recessed portions 61, 62 extend from the boss 10 in the axial direction and the radial direction to define an axial length of the boss 10 having an increased thickness. Ribs 11, 12 provide increased rigidity to the boss 10 in the area surrounding the kingpin, thereby improving retention of the kingpin and preventing motion between the kingpin and the boss 10. The boss 10 of this embodiment also improves the fatigue life of the boss 10 portion of the axle 50.

While the present invention has been described with reference to an exemplary component, a variety of components may be produced utilizing the apparatus and process described herein. Modifications and variations in the invention will be apparent to those skilled in the art in light of the foregoing description. It is therefore contemplated that the appended claims and their equivalents will embrace any such alternatives, modifications and variations as falling within the scope of the present invention.

What is claimed is:

1. A steering axle, comprising:
   an axle beam having distal ends, each distal end forming a boss having an outer surface and an inner surface, the inner surface defining a bore configured to receive a kingpin and having a central bore axis; and
   wherein the thickness between the inner surface and outer surface varies angularly to define first and second axially extending and angularly spaced ribs, each of said ribs extending angularly from a location outboard of said bore axis to a location inboard of said bore axis, each of said ribs separated from one another both outboard of the central bore axis and inboard of the central bore axis.

2. The steering axle of claim 1, further comprising:
   a circumferential reinforcement extending uniformly around the boss and defining a circumferential portion having an increased thickness; and
   wherein the first and second axially extending and angularly spaced ribs intersect the circumferential reinforcement and have a nonuniform thickness that gradually decreases as each rib extends farther from the circumferential reinforcement.

3. The steering axle of claim 2, wherein the boss further comprises:
   at least one portion having a draw-key aperture that intersects the inner surface; and
   wherein the draw-key aperture is located inboard of the first and second axially extending and angularly spaced ribs.

4. The steering axle of claim 2, wherein the circumferential reinforcement is positioned about a lower end of the bore axis.

5. The steering axle of claim 1, wherein the first and second axially extending and angularly spaced ribs are defined about the bore axis by a rib angle of at least 45 degrees and are separated outboard of the bore axis by an outboard angle of about 90 degrees.

6. The steering axle of claim 5, wherein the first and second axially extending and angularly spaced ribs are separated inboard of the bore axis by an inboard angle of about 180 degrees or less.

7. The steering axle of claim 4, wherein the first and second axially extending and angularly spaced ribs are defined about the bore axis by a rib angle of at least 45 degrees and are separated outboard of the bore axis by an outboard angle of about 90 degrees.

8. The steering axle of claim 7, wherein the first and second axially extending and angularly spaced ribs are separated inboard of the bore axis by an inboard angle of about 180 degrees or less.

9. The steering axle of claim 1, further comprising:
   a transverse beam section; and
   a pair of S-shaped beam sections, each S-shaped beam section extending upward from each end of the transverse beam section between each end of the transverse beam section and each boss.

10. The steering axle of claim 9, further comprising:
    a pair of spaced apart spring mounting pads proximal each end of the transverse beam section and inboard of the S-shaped beam sections.

11. The steering axle of claim 9, wherein at least a portion of each S-shaped beam section has an I-shaped cross section defined by a single pair of vertically spaced apart flanges and an interconnecting web.

12. The steering axle of claim 11, wherein the I-shaped cross section extends between an inboard end and an outboard end of the S-shaped beam section, and the interconnecting web of the S-shaped beam section has a non-uniform thickness that gradually increases along the length of the S-shaped beam section so that the web is thicker at the outboard end and thinner at the inboard end of the S-shaped beam section.

13. The steering axle of claim 1, further comprising:
    a recessed portion in each rib defining an area of the rib having decreased thickness from surrounding portions of the rib.

14. The steering axle of claim 4, further comprising:
    a recessed portion in each rib defining an area of the rib having decreased thickness from surrounding portions of the rib;
    wherein the recessed portion is located proximal to the circumferential reinforcement.

* * * * *